United States Patent [19]
Fasano et al.

[11] Patent Number: 6,051,329
[45] Date of Patent: Apr. 18, 2000

[54] SOLID OXIDE FUEL CELL HAVING A CATALYTIC ANODE

[75] Inventors: Benjamin V. Fasano, New Windsor; Kevin M. Prettyman, Holmes, both of N.Y.

[73] Assignee: International Business Machines Corporation, Armonk, N.Y.

[21] Appl. No.: 09/007,890

[22] Filed: Jan. 15, 1998

[51] Int. Cl.$^7$ .............................. H01M 8/12; H01M 4/88
[52] U.S. Cl. .......................... 429/30; 429/45; 29/623.4; 29/623.5
[58] Field of Search ................ 429/30, 32, 45; 29/623.3, 623.4, 623.5

[56] References Cited

U.S. PATENT DOCUMENTS

| | | | |
|---|---|---|---|
| 4,104,345 | 8/1978 | Anderson et al. | 264/43 |
| 4,474,731 | 10/1984 | Brownlow et al. | 419/5 |
| 4,778,549 | 10/1988 | Cowan, Jr. et al. | 156/89 |
| 4,857,420 | 8/1989 | Maricle et al. | 429/32 X |
| 5,151,334 | 9/1992 | Fushimi et al. | 429/45 X |
| 5,246,791 | 9/1993 | Fisher et al. | 429/16 |
| 5,290,642 | 3/1994 | Minh et al. | 29/623.5 X |
| 5,306,411 | 4/1994 | Mazanec et al. | 204/265 |
| 5,399,442 | 3/1995 | Shundo | 429/32 |
| 5,500,307 | 3/1996 | Anzai et al. | 429/44 X |
| 5,856,035 | 1/1999 | Khandkar et al. | 429/32 |
| 5,882,809 | 3/1999 | McPheeters et al. | 429/32 X |

Primary Examiner—Stephen Kalafut
Attorney, Agent, or Firm—Ira D. Blecker

[57] ABSTRACT

Disclosed is an SOFC having a catalytic anode including a porous, ceramic anode including a catalyst, wherein the catalyst is selected from the group consisting of platinum, rhodium, ruthenium and mixtures thereof; a dense, solid electrolyte adjacent to the porous, ceramic anode; a porous, ceramic cathode adjacent to the dense, solid electrolyte; and a dense, ceramic interconnect adjacent to the porous, ceramic cathode, wherein the dense, ceramic interconnect has nonintersecting passages for the flow of a fuel and an oxidant. Also disclosed is a method to make the SOFC having a catalytic anode.

13 Claims, 2 Drawing Sheets

SOLID OXIDE FUEL CELL HAVING A CATALYTIC ANODE

RELATED APPLICATIONS

This application is related to "A METHOD OF MAKING A SOLID OXIDE FUEL CELL WITH CONTROLLED POROSITY", Ser. No. 09/007,892, filed even date herewith, and "METHOD OF FORMING AN ALUMINUM NITRIDE ARTICLE UTILIZING A PLATINUM CATALYST", Ser. No. 09/007,625, filed even date herewith, U.S. Pat. No. 5,888,446, the disclosures of which are incorporated by reference herein.

BACKGROUND OF THE INVENTION

The present invention relates to the field of solid oxide fuel cells, and more particularly, relates to a solid oxide fuel cell having an anode incorporating a precious metal catalyst to internally reform the fuel.

A fuel cell is a device in which a first reactant, a fuel such as hydrogen or a hydrocarbon, is electrochemically reacted with a second reactant, an oxidant such as air or oxygen, to produce a DC electrical output. A fuel cell includes an anode, or fuel electrode, which enhances the rate at which electrochemical reactions occur on the fuel side. There is also a cathode, or oxidant electrode, which functions similarly on the oxidant side. In the solid oxide fuel cell (hereafter SOFC), a solid electrolyte, made of, for example, dense yttria-stabilized zirconica (YSZ) ceramic separates a porous ceramic anode from a porous ceramic cathode. The anode is made of, for example, nickelous oxide/YSZ cermet, and the cathode is made of, for example, doped lanthanum manganite.

In such an SOFC, the fuel flowing to the anode reacts with oxide ions to produce electrons and water, which is removed in the fuel flow stream. The oxygen reacts with the electrons on the cathode surface to form oxide ions that diffuse through the electrolyte to the anode. The electrons flow from the anode through an external circuit and thence to the cathode. The electrolyte is a nonmetallic ceramic that is typically a poor or nonconductor of electrons, ensuring that the electrons must pass through the external circuit to do useful work. However, the electrolyte permits the oxide ions to pass through from the cathode to the anode.

Each individual electrochemical cell, made of a single anode, a single electrolyte, and a single cathode, generates a relatively small voltage. To achieve higher voltages that are practically useful, the individual electrochemical cells are connected together in series to form a stack. The cells are connected in series electrically in the stack. The fuel cell stack includes an electrical interconnect between the cathode and the anode of adjacent cells. The fuel cell assembly also includes ducts or manifolding to conduct the fuel, oxidant and reactant products into and out of the stack.

Numerous publications describe conventional SOFC which completely oxidize methane to carbon dioxide and water. These SOFC are not designed to conduct chemical processes, but rather to generate electricity from fuel gas and air (or oxygen). The processes conducted within SOFC are selected for essentially complete combustion rather than partial combustion and require completion of an external electric circuit or oxidation of fuel gas for continuous operation.

The typical SOFC comprises an anode made of a mixture of nickel metal and YSZ and runs at 800–1000° C. since internal reforming is most efficient at these high temperatures. The ideal fuel for the anode is hydrogen but dangers of flammability, storage and energy storage density complicate its use. More commonly, the fuels used can be light hydrocarbons such as methane, propane, ethanol and methanol. Heavier fuels such as JP8 (jet fuel) and kerosene can also be used but in some cases the internal reforming is not efficient enough to reform the fuel and carbonaceous products are built up in the anode. Water vapor is typically added to the fuel source to aid reforming.

At the startup of a SOFC, the temperature is low and there exists the potential for inefficient reforming to create carbonaceous residue that can clog the pores of the anode and reduce efficiency of the SOFC.

Also, the trend in SOFC evolution or development is to lower the operating temperature of the SOFC to 550–800° C. so that less exotic materials can be used for interconnects, electrical connections and materials of construction for the housing of the SOFC. In lowering the temperature, the efficiency of the SOFC is also decreased, thereby leading to incomplete reforming of the fuel and consequent buildup of carbon and carbonaceous products in the anode. This problem is compounded when heavier fuels are utilized.

Solutions have been proposed by others to reduce carbon buildup in situations other than SOFC operation. For example, Mazanec et al. U.S. Pat. No. 5,306,411, the disclosure of which is incorporated by reference herein, have proposed using a catalyst in a cylindrical shell to dehydrogenate hydrocarbons to form hydrogen gas. The shell is partially filled with a bed of catalytic ceramic or metallic materials, including rhodium, ruthenium, palladium and platinum.

Brownlow et al. U.S. Pat. No. 4,474,731, the disclosure of which is incorporated by reference herein, discloses the addition of nickel or palladium as a pyrolysis catalyst to assist in the removal of carbonaceous residues resulting from the pyrolysis of the organic binder from a ceramic greensheet in a low oxygen atmosphere.

Cowan, Jr. et al. U.S. Pat. No. 4,778,549, the disclosure of which is incorporated by reference herein, discloses the addition of ruthenium, rhodium, palladium, osmium, iridium or platinum as a pyrolysis catalyst to assist in the removal of carbonaceous residues resulting from the pyrolysis of the organic binder from a ceramic greensheet in a neutral atmosphere.

Fisher et al. U.S. Pat. No. 5,246,791, the disclosure of which is incorporated by reference herein, discloses a reforming catalyst for a molten carbonate fuel cell. The catalyst may be rhodium, ruthenium, platinum or gold, either of which may be used in conjunction with nickel.

It would be desirable to have an SOFC with a relatively low operating temperature and high reforming efficiency for many fuel sources that would include light and medium hydrocarbons.

Accordingly, it is a purpose of the present invention to have an improved SOFC having a catalytic anode for greater efficiency in reforming fuels without carbonaceous residues.

It is a further purpose of the present invention to have an improved SOFC suitable for operating at a relatively low temperature and having a high reforming efficiency.

BRIEF SUMMARY OF THE INVENTION

One aspect of the invention relates to an SOFC having a catalytic anode comprising:

a porous, ceramic anode comprising a catalyst, wherein the catalyst is selected from the group consisting of platinum, rhodium, ruthenium and mixtures thereof;

a dense, solid electrolyte adjacent to the porous, ceramic anode;

a porous, ceramic cathode adjacent to the dense, solid electrolyte; and a dense, ceramic interconnect adjacent to the porous, ceramic cathode, wherein the dense, ceramic interconnect has nonintersecting passages for the flow of a fuel and an oxidant.

A second aspect of the invention relates to a method of making an SOFC with a catalytic anode, comprising the steps of:

forming at least one layer of unsintered ceramic material, the ceramic material chosen for use as an anode of an SOFC, the unsintered ceramic material comprising a catalyst selected from the group consisting of platinum, rhodium, ruthenium and mixtures thereof;

forming at least one layer of unsintered ceramic material, the ceramic material chosen for use as an electrolyte of an SOFC;

forming at least one layer of unsintered ceramic material, the ceramic material chosen for use as a cathode of an SOFC;

forming at least one layer of unsintered ceramic material, the ceramic material chosen for use as an interconnect of an SOFC;

stacking and laminating the anode, electrolyte, cathode and interconnect layers into an SOFC unsintered laminate; and sintering the SOFC unsintered laminate in a neutral or reducing atmosphere to result in an SOFC having a catalytic anode.

BRIEF DESCRIPTION OF THE DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

Figure 1:
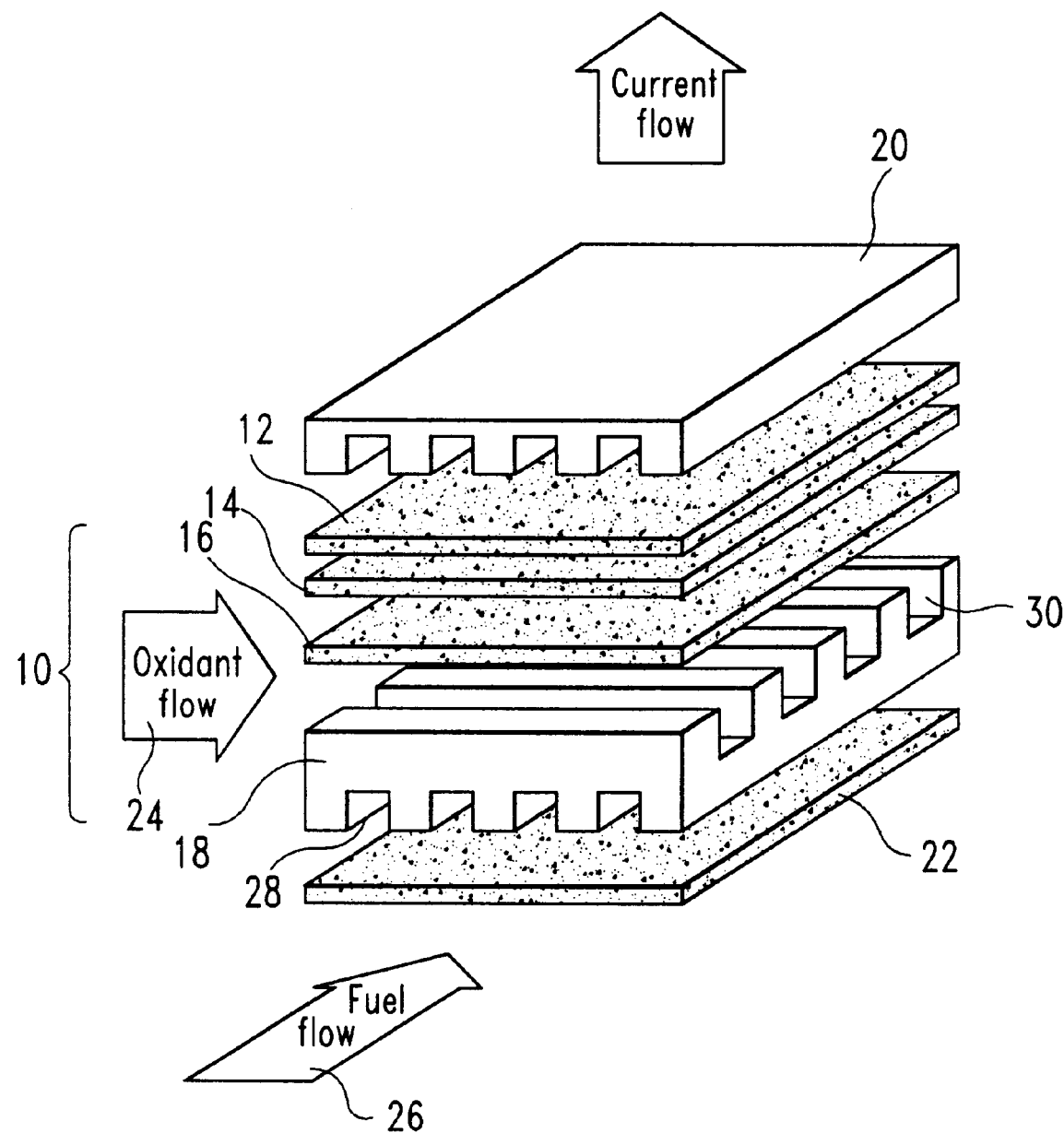
FIG. 1 is a perspective exploded view of an SOFC.

Referring to the Figures in more detail, and particularly referring to FIG. 1, there is disclosed an SOFC 10, which consists of anode 12, solid electrolyte 14, cathode 16 and interconnect 18. These four elements make up the basic SOFC. Additional SOFC(s) can be stacked above and below SOFC 10 to provide a SOFC assembly. Thus, adjacent to interconnect 18 is anode 22 which begins the next SOFC. As SOFC 10 is the last in the stack of SOFC, adjacent to anode 12 is end plate 20 instead of another interconnect.

Anode 12 and cathode 16 are porous. The size and volume percent of porosity of the anode 12 and cathode 16 can be chosen to meet the design objectives of the SOFC assembly. Solid electrolyte 14 and interconnect 18 are dense, that is, having only a limited amount of porosity (i.e., having no more than about five (5) volume percent porosity) so that gas flow cannot proceed through the solid electrolyte 14. Electrical connections between the anode 12 and cathode 16, which normally carry the current flow, are omitted for clarity.

Interconnect 18 has passages for the flow of fuel and oxidant. As shown in FIG. 1, passages 28 are arranged for the fuel flow 26 while passages 30 are arranged for the oxidant flow 24. For the present design of the interconnect 18, fuel flow passages 28 and oxidant flow passages 30 are orthogonal to each other but they are not intersecting. For safe and efficient operation of the SOFC, it is necessary to separate the fuel flow 26 from the oxidant flow 24.

The materials of the anode 12, solid electrolyte 14, cathode 16 and interconnect 18 may be chosen from any of the many suitable ceramic materials available for SOFC. Some of these materials include YST or partially stabilized, yttria doped tetragonal zirconia for the anode; perovskites for the cathode; fully stabilized yttria doped, cubic zirconia for the electrolyte; and $LaCrO_3$-based oxides for the interconnect.

Figure 2:
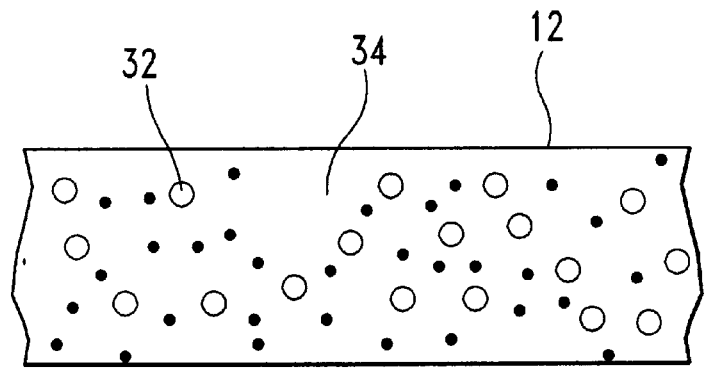
FIG. 2 is an enlarged cross sectional view of a first embodiment of the catalytic anode according to the present invention.

Referring now to FIG. 2, there is shown a partial cross sectional view of the anode 12 having porosity 32. As is well known, anode 12 may be made from a nickel-YST cermet. Nickel is sometimes thought of as a catalyst as for example disclosed in the above Brownlow et al. patent. The present inventors have found, however, that the precious metals such as rhodium, ruthenium and platinum are superior catalysts. Accordingly, the present inventors have proposed additions 34 of precious metal catalysts, that is rhodium, ruthenium or platinum, in the ceramic material that comprises the anode. Mixtures of these metal catalysts may also be added. If the anode material comprises a material such as nickel-YST cermet, the catalyst additions 34 may be added in addition to the nickel, although the presence of a second catalyst such as nickel is believed to not always be necessary for the operation of the present invention.

Since the catalyst additions 34 are intermixed with the porosity 32 in the anode 12, there is intimate contact between the fuel flow 26 and the catalyst additions 34, thereby leading to improved reforming of the fuel.

The catalyst additions 34 may be added to the ceramic material in the amount of 5 to 5000 ppm (parts per million), and preferably in the range of 50 to 500 ppm.

The fuel cell of the present invention can be made with multilayer ceramic technology which allows for the tailoring of the composition and porosity of the components of the SOFC.

Appropriate ceramic powders would be chosen for each of the components of the SOFC. Binders, solvents, plasticizers, rheological control agents and the ceramic powder would be ball milled for a sufficient time to mix the various ingredients. The mixture would then be tape cast in layers having a thickness of 1 to 30 mils. Thereafter, the tape layer would be blanked to form the individual layers of each of the components of the SOFC. Those layers that form the interconnect 18 would be patterned to form passages 28, 30.

The anode layers would be formed similarly except that the ingredients for the anode layers would contain a catalyst addition 34. The catalyst addition 34 could be added to the anode layers by any of several methods. One method is to add a soluble salt such as $PtCl_3$, $RuCl_3$, or $RhCl_3$ to the ball mill mixture. Then, when the tape layers are cast, the soluble salt is uniformly dispersed within the tape layer. During sintering, the soluble salt is reduced to the metal.

Another method is to add elemental platinum, ruthenium or rhodium to the ball mill mixture. Then, when the tape layers are cast, the elemental metal is uniformly dispersed within the tape layer.

Figure 3:
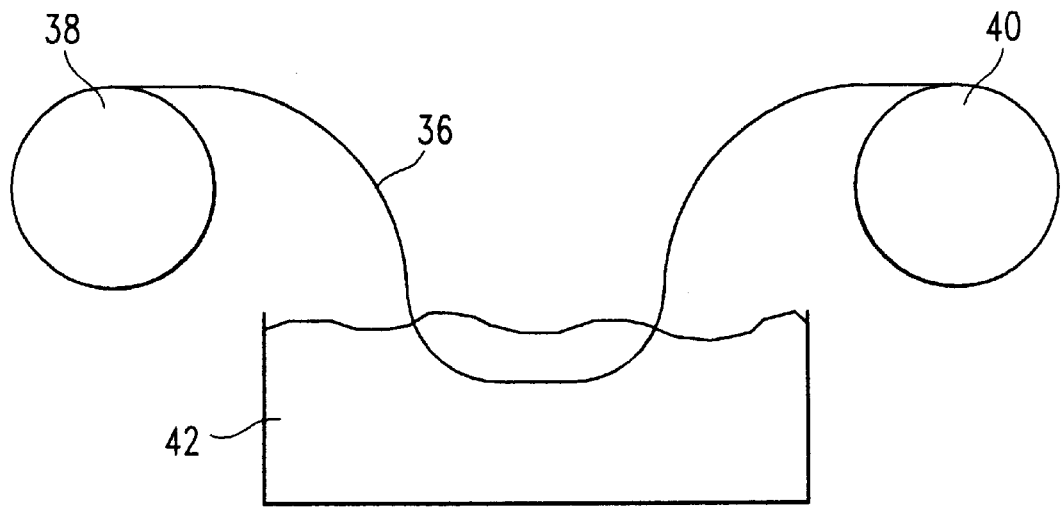
FIG. 3 is a schematic of a process for infiltrating the anode with a catalyst addition.
Figure 4:
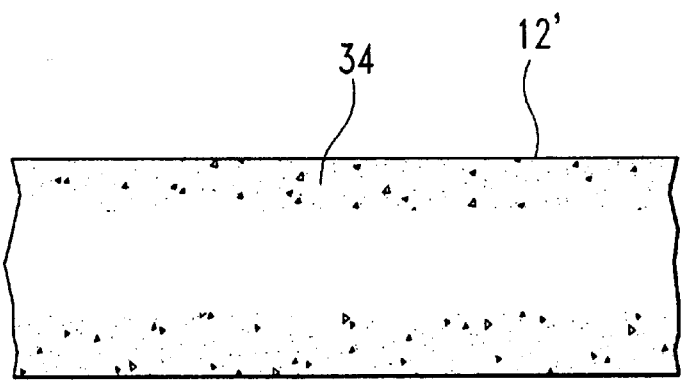
FIG. 4 is an enlarged cross sectional view of a second embodiment of the catalytic anode according to the present invention.

A further method to add the catalyst to the anode layers is by an infiltration technique as illustrated in FIG. 3. The tape formulation and casting process is chosen so as to form a porous microstructure which may be accomplished by using a dual solvent system such as that disclosed in Anderson et al. U.S. Pat. Pat. No. 4,104,345, the disclosure of which is incorporated by reference herein. Tape cast layer 36 is pulled from reel 38 at a desired rate to take-up reel 40 and immersed in bath 42 containing a precious metal soluble salt such as those listed above. A cross section of the resulting anode layer 12' is shown in FIG. 4. As can be seen, the presence of the catalyst addition 34 can be controlled to be greatest at the outer portions of the layer if desired. It is believed that a gradient of catalyst addition 34 would nevertheless result in improved reforming of the fuel.

Yet another method to add platinum, ruthenium or rhodium to the anode is to "vacuum impregnate" it after sintering. A solution containing the metal would be pulled through the porous anode by a vacuum, leaving a residue of metal-containing solution in the pores of the anode. Upon drying, platinum, ruthenim or rhodium would be left in the anode pores.

Other methods of adding the catalyst to the anode will be apparent to one skilled in the art.

Once the layers are formed as above, they are stacked and laminated to form an SOFC laminate. Depending on the thickness of the individual layers and the size of the SOFC, there may be several layers that make up each component of the SOFC.

The SOFC laminate is then sintered in an appropriate atmosphere to result in the SOFC. Preferably, a neutral or reducing atmosphere is utilized. The reasons why sintering is performed in a reducing or neutral atmosphere include the reliability problems with typical usage of nickel metal in the anode. Usually air is the sintering atmosphere. All nickel metal transforms to NiO with a large volume change. The NiO is reduced the first time the SOFC stack operates and a reducing gas is introduced into the anode. Thus, NiO transforms to nickel metal with significant shrinkage and microcracking. It is desirable to start with nickel metal or NiO in the tape layer and have predominantly nickel metal at the end of sintering. In this way, there is little or no reduction at stack startup and no microcracking to cause leaks and cell performance degradation.

A typical sintering cycle could include ramping up to a temperature where densification does not occur (for example, about 600–700 degrees Centigrade for many ceramics) in a slightly oxidizing atmosphere containing, for example, water vapor to pyrolyze and burn-off the binder material followed by densification at a much higher temperature (for example, 1000–1500 degrees Centigrade) in a neutral or reducing atmosphere.

As noted above, both the anode and cathode are porous while the electrolyte and interconnect are dense. The present inventors have proposed a method to control the porosity of the anode, cathode, electrolyte and interconnect layers. The resulting porosity in the anode, cathode, electrolyte and interconnect layers may be controlled by the appropriate choice of initial ceramic particle size, organics to form the tape layer, sintering cycle and catalyst addition.

In layers where there is to be high porosity, minimal catalyst is added to the greensheets that make up the layers. When these layers are sintered in a furnace atmosphere with controlled $PO_2$, (i.e. the partial pressure of oxygen) the amount or rate of carbon removal will be minimized which will act to slow or stop the densification of, for example, ceramic powders. In those layers where a high density or rapid densification rate of the ceramic is needed, for instance in the nonporous electrolyte or when trying to match a higher shrinkage rate of other layers, a high level of catalyst can be added during the greensheet fabrication process to remove more carbon.

The amount of residual carbon can also be enhanced by choosing additives that are not easily removed during binder burn-off. For example, high molecular weight polymers and those which have a high tendency to crosslink are not easily removed during binder burn-off and thus leave higher residual amounts of carbon after pyrolysis prior to particle sintering. One such group of additives are polymeric dispersants that leave high residual carbon such as HYPERMER (R) KD1, KD2, KD3, and KD4 polymeric dispersants available from ICI Specialty Chemicals, Wilmington, Del.

In addition, particle size can be controlled and differentiated among the various layers in order to enhance or prevent full densification. Generally speaking, the smaller the particle size, the greater will be the densification.

Sintering cycle can also be used advantageously to affect porosity in that a short sintering cycle can lead to greater porosity than a longer sintering cycle.

It is believed that amounts of catalyst in the range of 0 to about 10 ppm are preferable where porous layers are desired while amounts of catalyst in the range of about 3 to about 5000 ppm are preferable where dense layers are desired. The amount of catalyst necessary to achieve a porous layer is on the low end of the above range when additives with high residual carbon are utilized. Also, larger particle sizes and shorter sintering cycles will also require smaller amounts of the catalyst to achieve a porous structure. Conversely, the amount of catalyst necessary to achieve a dense layer is on the upper end of the above range when additives with high residual carbon are utilized. The catalyst may be reduced if smaller particle sizes and/or longer sintering cycles are utilized.

To summarize, porous articles may generally be obtained with a suitable combination of larger ceramic particle size, high molecular weight organics, shorter sintering cycle and minimal catalyst. Dense articles may be obtained with a suitable combination of smaller particle size, easily burned out organics, long sintering cycle and higher amounts of catalyst.

It should be understood that by varying the ceramic particle size, type of organic and sintering cycle, porous articles may be obtained even with large amounts of catalyst. This would be the case with the catalytic anode as discussed above.

As is apparent, the above ranges are guides for a person skilled in the art who could choose the optimum range for his particular application without undue experimentation.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

What is claimed is:

1. An SOFC having a catalytic anode comprising:
   a porous, ceramic anode comprising a catalyst in the range of 5 to 5000 ppm dispersed within the porous, ceramic anode, wherein the catalyst is selected from the group consisting of platinum, rhodium, ruthenium and mixtures thereof;
   a solid electrolyte adjacent to the porous, ceramic anode, the solid electrolyte having no more than about 5 volume percent porosity;
   a porous, ceramic cathode adjacent to the solid electrolyte; and
   a ceramic interconnect adjacent to the porous, ceramic cathode, wherein the ceramic interconnect has nonintersecting passages for the flow of a fuel and/or an oxidant and has no more than about 5 volume percent porosity.

2. The SOFC of claim 1 wherein the catalyst dispersed within the porous, ceramic anode is present in the range of 50 to 500 ppm.

3. The SOFC of claim 1 wherein the ceramic material of the anode is yttria-stabilized zirconia.

4. The SOFC of claim 1 wherein the ceramic anode further comprises Ni or NiO.

5. The SOFC of claim 1 wherein the ceramic material of the anode is partially stabilized, yttria-doped tetragonal zirconia.

6. The SOFC of claim 5 wherein the ceramic anode further comprises Ni or NiO.

7. A method of making an SOFC with a catalytic anode, comprising the steps of:
   forming at least one layer of unsintered ceramic material, the ceramic material chosen for use as an anode of an SOFC, the unsintered ceramic material comprising a catalyst present in the range of 5 to 5000 ppm, based on the solids content of the ceramic and catalyst materials, selected from the group consisting of platinum, rhodium, ruthenium and mixtures thereof;
   forming at least one layer of unsintered ceramic material, the ceramic material chosen for use as an electrolyte of an SOFC;
   forming at least one layer of unsintered ceramic material, the ceramic material chosen for use as a cathode of an SOFC;
   forming at least one layer of unsintered ceramic material, the ceramic material chosen for use as an interconnect of an SOFC;
   stacking and laminating the anode, electrolyte, cathode and interconnect layers into an SOFC unsintered laminate; and
   sintering the SOFC unsintered laminate in a neutral or reducing atmosphere to result in an SOFC having a catalytic anode.

8. The method of claim 7 wherein the catalyst in the at least one unsintered anode layer is present in the range of 50 to 500 ppm, based on the solids content of the ceramic and catalyst materials.

9. The method of claim 7 wherein the step of forming the at least one unsintered anode layer comprises mixing the catalyst in with the ceramic material prior to forming the at least one unsintered anode layer.

10. The method of claim 9 wherein the catalyst is mixed in with the ceramic material of the at least one unsintered anode layer in the form of a soluble salt.

11. The method of claim 9 wherein the catalyst is mixed in with the ceramic material of the at least one unsintered anode layer in the form of an elemental metal.

12. The method of claim 7 wherein the step of forming the at least one unsintered anode layer comprises immersing the at least one unsintered anode layer in a solution comprising a soluble salt of the catalyst to thereby cause the catalyst to impregnate at least the outer portions of the at least one unsintered anode layer.

13. A method of making an SOFC with a catalytic anode, comprising the steps of:
   forming at least one layer of unsintered ceramic material, the ceramic material chosen for use as an anode of an SOFC;
   forming at least one layer of unsintered ceramic material, the ceramic material chosen for use as an electrolyte of an SOFC;
   forming at least one layer of unsintered ceramic material, the ceramic material chosen for use as a cathode of an SOFC;
   forming at least one layer of unsintered ceramic material, the ceramic material chosen for use as an interconnect of an SOFC;
   stacking and laminating the anode, electrolyte, cathode and interconnect layers into an SOFC unsintered laminate;
   sintering the SOFC unsintered laminate in a neutral or reducing atmosphere to result in an SOFC having a catalytic anode; and
   vacuum impregnating the sintered SOFC with a catalyst selected from the group consisting of platinum, rhodium, ruthenium and mixtures thereof.

* * * * *